Aug. 17, 1943.  W. A. BESSERDICH  2,326,747
VALVE GEAR
Filed Sept. 15, 1941
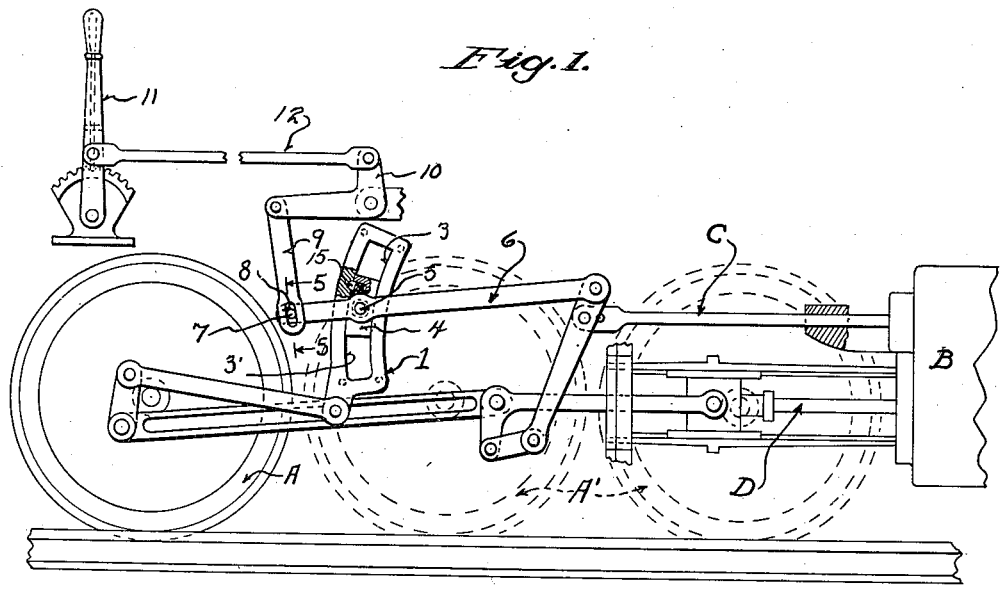
Fig. 1.
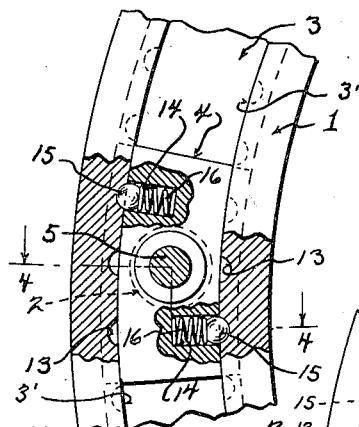
Fig. 2.
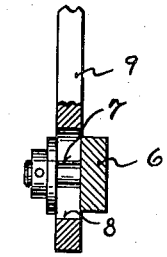
Fig. 5.
Fig. 3.
Fig. 4.
INVENTOR
WILLIAM A. BESSERDICH
BY
ATTORNEYS Patented Aug. 17, 1943

2,326,747

UNITED STATES PATENT OFFICE 2,326,747

VALVE GEAR

William A. Eesserdich, Clintonville, Wis.

Application September 15, 1941, Serial No. 410,873

1 Claim. (Cl. 121—170)

My invention refers to valve gear particularly applicable to locomotives and it has for its primary object to provide a simple, economical and effective means for positively eliminating creep of the link block in its arcuate slot and also to eliminate the arc movement of the radius bar whereby selected adjustment of the valve gear is positively maintained.

I am aware of the fact that various structures have been deevloped to prevent creeping action of the link block usually caused by vibration or strain. Also in such assemblage, the link block is liable to shift from its set position due to the arc movement of the radius bar upon its fulcrum when the end of said bar is fixedly pivoted to a strap element forming part of the manual shift mechanism for controlling the valve stroke.

My invention is specifically directed to overcoming the above noted objectionable features.

With the above objects in view, my invention consists in certain peculiarities of construction and combination of parts as will hereinafter be fully set forth with reference to the accompanying drawing and subsequently claimed.

In the drawing:

Figure 1 represents a side elevational view of the locomotive valve gear embodying the features of my invention, parts being broken away to more clearly illustrate structural features.

Figure 2 is a magnified view of a fragment of the link and associated link block, with parts broken away and in section to more clearly illustrate structural features of my invention.

Figure 3 is a similar fragmentary view with the link block broken away to illustrate the pivot pin of said link.

Figure 4 is a cross section of a link and block, the section being indicated by line 4—4 of Figure 2.

Figure 5 is a detailed cross sectional side view of the swinging strap connecting the bell crank and the radius bar illustrating the play between said pivot of the radius bar and the strap.

Referring by characters to the drawing, A indicates one of the series of engine drive wheels, the others being indicated in dotted lines at A'; B the engine cylinder; C the valve rod, and D the engine piston rod, which is connected to the drive wheels by various links as indicated, all of which parts form no part of my invention.

The standard link 1 is swiveled upon a pin 2, and and said link is provided with the usual arcuate slot 3 having mounted therein the usual slidable link block 4.

The link block 4 is provided with a pivot stud 5 which engages the radius bar 6, and the end of said bar terminates with a pin 7 which pin is mounted in a slot 8 formed in the swinging strap 9. The upper end of the strap 9 is pivotally connected to one arm of a bell crank lever 10 and the other arm of said lever is connected to a reverse lever 11 by a reach rod 12.

It is understood under modern conditions that the manually operated reverse lever may be replaced by a fluid control cylinder, not illustrated, whereby adjustment of the valve gear is had.

As shown by the illustrations, the edge walls 3' of the link are formed with a plurality of hemispherical recesses 13, suitably spaced apart throughout the length of the parallel circular walls 3'.

The link block 4 is provided with oppositely disposed upper and lower pockets 14 for the reception of balls 15, which balls are engaged by coil springs 16, interposed between their inner surfaces and the bottom of the pockets 14, whereby said balls are normally pressed outwardly against the circular walls containing the ball recesses 13, it being understood that the locking balls 15 are positioned upon opposite sides of the pivot stud 5 whereby their locking effect is balanced relative to the stud.

From the foregoing description it will be understood that my equipment will eliminate either creeping or slippage of the link adjustment, due to the frictional locking of the link block in its adjusted position. The slot 8 in the pivot connection between the radius bar and the swinging strap eliminates the arc movement of the radius which normally tends to displace the adjustment of the link block 4.

My two novel features can readily be adjusted to any standard engine now in use, at slight expense and in new engine link gear they may constitute standard equipment. While I have shown one simple means for carrying out my invention, it is manifest that the generic principles involved may vary as to structural features.

From the foregoing description it will be readily noted that in Figure 1 of said drawing, the link block pivot 5, is concentric to the pivot pin 2 of said link, or upon a dead center with relation to the link's oscillatory movement.

Under the above conditions, should the reach rod 12 be actuated either forwardly or backwardly, when the pin 7 of the radius bar engages one end of the slot 8, whereby said radius bar will be moved up or down and through this pivot connection 5 the link block 4 will slide to a different position and when the friction balls 15 come into alignment with the corresponding link recesses 13, the slide block will be frictionally locked in its adjusted position, with relation to the link, and hence this spring control ball locking mechanism will hold the block against creeping, due to vibration.

Furthermore, when the link movement is in action, the radius bar 6 will move in a straight line back and forth, due to the slot and pin connection 7 and 8, whereby play at this point will compensate for the arc movement in the swinging strap connection resulting when said strap is directly pivoted to the end of the radius bar 6, which arc movement under usual construction would tend to swing the bar 6 up or down and displace the set position of the sliding link block. It will be noted when the shift mechanism is manually operated by the lever 11, the pin 7 will initially engage either end of the slot 8 before movement of the radius bar can be effected. As the upward or downward adjustment of said radius bar is completed, the spring pressed friction balls will frictionally lock in connection with the link and when said lock is effected, the well known detent mechanism of lever 11 will engage a socket between the teeth of its locking sector, in which position the pin 7 will be centrally disposed with reference to the length of the slot 8. Hence, when the radius bar rocks upon its fulcrum 5, due to the valve movement, its end carrying the pin 7, although describing an arc, the movement of said pin in the slot 8 does not exert a pressure tending to shift the block which would be the result, in the event that there was a positive pivot connection between the strap 9 and radius bar 6.

While I have shown and described a simple exemplification of my invention minutely as to detail, it is understood that I may vary the structural features within the scope of the claim.

In a valve gear having a manually actuated reverse mechanism including a bell-crank lever and strap depending therefrom, a link provided with an arcuate slot, a block slidably mounted in the link slot, a stud extending from the block, a radius bar fulcrumed upon the stud intermediate its ends, one end of said radius bar being connected to the valve rod and the opposite end in loose pivotal connection with the reverse mechanism strap; the combination of means for frictionally locking the block in its selected position with reference to the link, the same including locking recesses in opposite walls of link, spring controlled balls mounted in the opposite walls of the block above and below the block stud, for balanced engagement with the link recesses, whereby uniform grip between the block and the link walls is effected to eliminate cramping friction incidental to movement of the aforesaid block with reference to the arcuate slot of the offset link.

WILLIAM A. BESSERDICH.